United States Patent
Hatakeyama et al.

(10) Patent No.: US 10,934,463 B2
(45) Date of Patent: Mar. 2, 2021

(54) ADHESIVE FILM, METHOD FOR FORMING AN ADHESIVE FILM, AND URETHANE POLYMER

(71) Applicant: SHIN-ETSU CHEMICAL CO., LTD., Tokyo (JP)

(72) Inventors: Jun Hatakeyama, Joetsu (JP); Motoaki Iwabuchi, Joetsu (JP); Keisuke Niida, Joetsu (JP); Koji Hasegawa, Joetsu (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 16/369,481

(22) Filed: Mar. 29, 2019

(65) Prior Publication Data
US 2019/0322903 A1 Oct. 24, 2019

(30) Foreign Application Priority Data
Apr. 23, 2018 (JP) .............. JP2018-82343

(51) Int. Cl.
| | |
|---|---|
| *C09J 175/04* | (2006.01) |
| *C09J 183/10* | (2006.01) |
| *C09J 7/30* | (2018.01) |
| *C09J 7/10* | (2018.01) |
| *C09J 5/06* | (2006.01) |
| *C09J 175/16* | (2006.01) |
| *C08G 77/458* | (2006.01) |
| *C08G 18/83* | (2006.01) |
| *C08G 77/00* | (2006.01) |

(52) U.S. Cl.
CPC .......... *C09J 175/04* (2013.01); *C08G 18/837* (2013.01); *C08G 77/458* (2013.01); *C09J 5/06* (2013.01); *C09J 7/10* (2018.01); *C09J 7/30* (2018.01); *C09J 175/16* (2013.01); *C09J 183/10* (2013.01); *C08G 77/70* (2013.01); *C09J 2451/00* (2013.01); *C09J 2475/00* (2013.01); *C09J 2483/00* (2013.01)

(58) Field of Classification Search
None
See application file for complete search history.

(56) References Cited

U.S. PATENT DOCUMENTS

| | | |
|---|---|---|
| 2004/0024098 A1 | 2/2004 | Mather et al. |
| 2004/0116641 A1 | 6/2004 | Mather et al. |
| 2018/0179425 A1* | 6/2018 | Mather ............. C08G 18/61 |
| 2019/0071534 A1 | 3/2019 | Hattori et al. |
| 2019/0151648 A1* | 5/2019 | Hatakeyama ...... C08G 18/792 |

FOREIGN PATENT DOCUMENTS

| | | | |
|---|---|---|---|
| JP | H10-087834 | A | 4/1998 |
| JP | 2004-033468 | A | 2/2004 |
| JP | 2006-503170 | A | 1/2006 |
| JP | 2006-265243 | A | 10/2006 |
| JP | 4960631 | B2 | 6/2012 |
| JP | 2012-152725 | A | 8/2012 |
| JP | 2017-186691 | A | 10/2017 |
| KR | 2018/0044076 | * | 1/2018 |
| KR | 2019/016170 | * | 2/2019 |

OTHER PUBLICATIONS

Machine translation of KR 2019/016170 (no date).*
Oct. 20, 2020 Office Action issued in Korean Patent Application No. 10-019-0047141.

* cited by examiner

*Primary Examiner* — Marc S Zimmer
(74) *Attorney, Agent, or Firm* — Oliff PLC

(57) ABSTRACT

The present invention provides an adhesive film including a resin having a silsesquioxane in a side chain and a urethane bond in a main chain, together with a method for forming the same. The inventive adhesive film has excellent stretchability and strength, with the film surface having higher adhesion and thinner film thickness.

10 Claims, No Drawings

ADHESIVE FILM, METHOD FOR FORMING AN ADHESIVE FILM, AND URETHANE POLYMER

TECHNICAL FIELD

The present invention relates to an adhesive film, a method for forming the same, and a urethane polymer.

BACKGROUND ART

A recent growing popularity of Internet of Things (IoT) has accelerated the development of such major wearable devices as watches and glasses that allow for Internet access. Even in the fields of medicine and sports, wearable devices for constantly monitoring the user's physical state are increasingly demanded, and such technological development is expected to be further encouraged.

One typical wearable device is attached to the human body of users to constantly monitor the state of physical conditions. The wearable device includes a bio-electrode for detecting an electric signal transmitted from a body, wires for sending the electric signal to a sensor, a semiconductor chip serving as a sensor, and a battery, as well as an adhesive pad to be constantly attached to the skin. Patent Document 1 describes detailed structures of a bio-electrode, a wiring part surrounding the bio-electrode, and an adhesive pad. In the wearable device disclosed in Patent Document 1, a silicone-based adhesive film is disposed around the bio-electrode, and a meandering-shaped stretchable silver wiring coated with a stretchable urethane film connects the bio-electrode and the sensor device.

The adhesive is divided broadly into urethane type, acrylic type, and silicone type. The urethane type has higher stretchability and strength, but lower adhesion. The acrylic type has higher adhesion, but lacks in stretchability and strength. The silicone type has higher adhesion and stretchability, but lacks in strength, and is required to have a certain amount of film thickness to achieve the adhesion. The stretchable wearable use requires an adhesive with higher stretchability, higher strength, and higher adhesion without causing sticky feeling to skin. To decrease the uncomfortable feeling of sticking, it is necessary to have higher stretchability and thinner film thickness.

Patent Document 2 proposes ladder shape silsesquioxane (SSQ) having a diol group(s). In this case, the silsesquioxane is formed by hydrolysis condensation of a silane compound having an epoxy group, followed by ring opening of the epoxy group by an acid to give the diol. Since every silicon atom protrudes a diol group, this reacts with isocyanate to give a urethane film with higher crosslinking density and lower stretchability. Accordingly, Patent Document 3 has proposed a compound having silsesquioxane in the main chain and reactive groups at the both sides thereof. This gives higher stretchability compared to the above described one, but fails to give sufficient stretchability since the main chain has a rigid silsesquioxane bond.

Patent Document 4 proposes a urethane polymer having a pendant of POSS™, which is cage shape silsesquioxane. This form is expected to achieve higher strength and stretchability due to the urethane main chain as well as improvement in repellency due to the POSS™ in the side chain. However, the synthesis of the tetrahedral POSS™ involves lower productivity, the POSS™ compounds involve a drawback of difficulty in mixing with other monomers due to the lower solubility, and the adhesion properties are not remarkable due to the smaller size of the tetrahedral POSS™.

CITATION LIST

Patent Literature

Patent Document 1: Japanese Patent Laid-Open Publication No. 2004-033468
Patent Document 2: Japanese Patent Laid-Open Publication No. H10-87834
Patent Document 3: Japanese Patent Laid-Open Publication No. 2006-265243
Patent Document 4: Japanese Patent Laid-Open Publication No. 2006-503170

SUMMARY OF INVENTION

Technical Problem

Due to these backgrounds, it has been demanded to develop a stretchable film having excellent stretchability and strength equal to those of polyurethane as well as highly adhesive film surface, together with a method for forming the same.

The present invention is accomplished to solve the above problems, and the object thereof is to provide a stretchable adhesive film having excellent stretchability and strength, highly adhesive film surface, and thinner film thickness; a method for forming the same; as well as a urethane polymer.

Solution to Problem

To solve the problems, the present invention provides an adhesive film comprising a resin having a silsesquioxane in a side chain and a urethane bond in a main chain.

The adhesive film like this has excellent stretchability and strength, with the film surface having higher adhesion.

It is preferable that the resin having a silsesquioxane in a side chain and a urethane bond in a main chain include a structure shown by the following general formula (1):

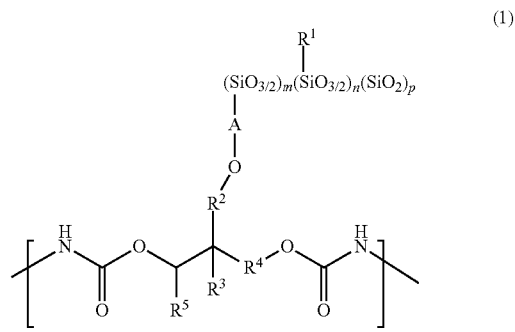

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom; $R^2$ and $R^4$ each represent a single bond, a methylene group, or an ethylene group, and the total number of carbon atoms in $R^2$ and $R^4$ is 0 to 2; $R^3$ represents a hydrogen atom or a linear alkyl group having 1 to 4 carbon atoms; $R^5$ represents a hydrogen atom or a methyl group; "A" represents a linear or branched alkylene group having 1 to 6 carbon atoms; and "m", "n", and "p" are numbers satisfying 0<m≤0.2, 0.4≤n<1.0, and 0≤p<0.5.

With the resin having a silsesquioxane in a side chain and a urethane bond in a main chain like this, the adhesion can be more improved.

It is preferable that the resin having a silsesquioxane in a side chain and a urethane bond in a main chain satisfy 0.01≤p<0.5.

With the resin having a silsesquioxane in a side chain and a urethane bond in a main chain like this, the adhesion can be further improved.

It is preferable that the resin having a silsesquioxane in a side chain and a urethane bond in a main chain be a reaction product of a diol compound shown by the following general formula (2) and a compound having an isocyanate group,

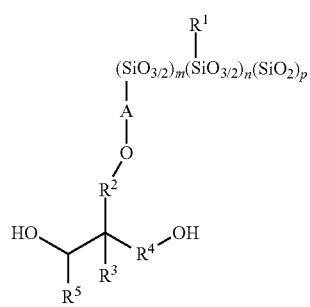

(2)

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom; $R^2$ and $R^4$ each represent a single bond, a methylene group, or an ethylene group, and the total number of carbon atoms in $R^2$ and $R^4$ is 0 to 2; $R^3$ represents a hydrogen atom or a linear alkyl group having 1 to 4 carbon atoms; $R^5$ represents a hydrogen atom or a methyl group; "A" represents a linear or branched alkylene group having 1 to 6 carbon atoms; and "m", "n", and "p" are numbers satisfying 0<m≤0.2, 0.4≤n<1.0, and 0≤p<0.5.

It is preferable that the resin having a silsesquioxane in a side chain and a urethane bond in a main chain be a reaction product of a diol compound shown by the following general formula (3) and a compound having an isocyanate group,

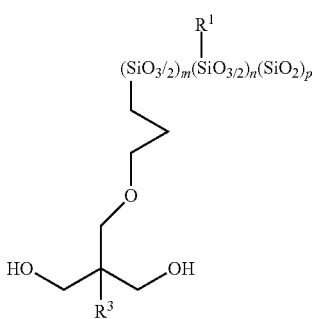

(3)

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom; $R^3$ represents a hydrogen atom or a linear alkyl group having 1 to 4 carbon atoms; and "m", "n", and "p" are numbers satisfying 0<m≤0.2, 0.4≤n<1.0, and 0≤p<0.5.

It is preferable that the diol compound shown by the general formula (3) be a reaction product of compounds shown by the following general formulae (4)-1, (4)-2, and (4)-3:

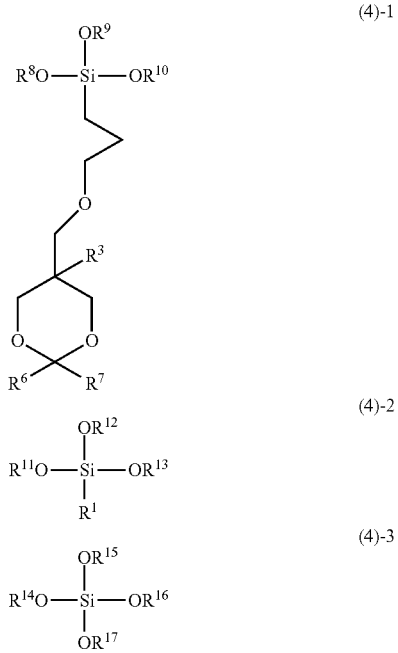

wherein $R^1$ and $R^3$ have the same meanings as defined above; $R^6$ and $R^7$ each represent a hydrogen atom, a linear, branched, or cyclic alkyl group having 1 to 10 carbon atoms, an alkenyl group having 2 to 10 carbon atoms, an alkynyl group having 2 to 10 carbon atoms, or an aryl group having 6 to 10 carbon atoms; $R^8$ to $R^{17}$ each represent a linear, branched, or cyclic alkyl group having 1 to 6 carbon atoms.

In the present invention, such a reaction product of a diol compound and a compound having an isocyanate group can be used as the resin having a silsesquioxane in a side chain and a urethane bond in a main chain.

It is preferable that the resin having a silsesquioxane in a side chain and a urethane bond in a main chain be a cured material of a compound having a (meth)acrylate group at a terminal thereof shown by the following general formula (5):

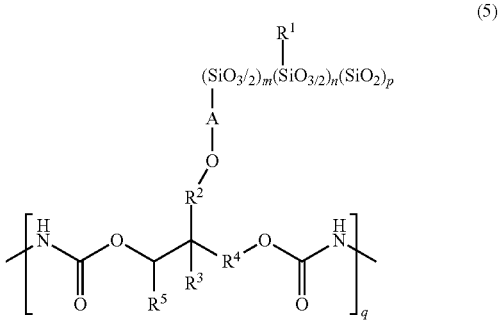

(5)

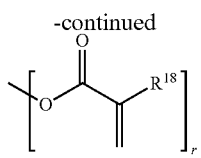

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom; $R^2$ and $R^4$ each represent a single bond, a methylene group, or an ethylene group, and the total number of carbon atoms in $R^2$ and $R^4$ is 0 to 2; $R^3$ represents a hydrogen atom or a linear alkyl group having 1 to 4 carbon atoms; $R^5$ represents a hydrogen atom or a methyl group; "A" represents a linear or branched alkylene group having 1 to 6 carbon atoms; "m", "n", and "p" are numbers satisfying $0<m\leq0.2$, $0.4\leq n<1.0$, and $0\leq p<0.5$; $R^{18}$ represents a hydrogen atom or a methyl group; and each of "q" and "r" is the number of unit in one molecule in the range of $1\leq q\leq 100$ and $1\leq r\leq 3$.

The resin having a silsesquioxane in a side chain and a urethane bond in a main chain like this can be cured by combining heat curing and photo curing.

It is preferable that the resin having a silsesquioxane in a side chain and a urethane bond in a main chain have a weight average molecular weight of 500 or more.

Having such a weight average molecular weight, the resin can be used for the inventive adhesive film suitably.

The present invention also provides a method for forming an adhesive film, comprising:

mixing at least a diol compound shown by the following general formula (2) and a compound having an isocyanate group to prepare a mixture, forming a film from the mixture, and curing the film by heating,

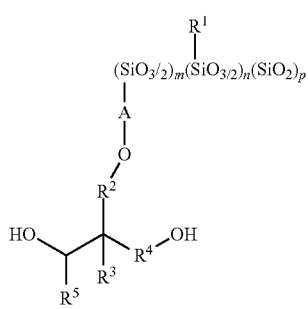

(2)

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom; $R^2$ and $R^4$ each represent a single bond, a methylene group, or an ethylene group, and the total number of carbon atoms in $R^2$ and $R^4$ is 0 to 2; $R^3$ represents a hydrogen atom or a linear alkyl group having 1 to 4 carbon atoms; $R^5$ represents a hydrogen atom or a methyl group; "A" represents a linear or branched alkylene group having 1 to 6 carbon atoms; and "m", "n", and "p" are numbers satisfying $0<m\leq0.2$, $0.4\leq n<1.0$, and $0\leq p<0.5$.

The method for forming an adhesive film like this makes it possible to form an adhesive film having excellent stretchability and strength, higher adhesion, and thinner film thickness; and makes it possible to control the hardness, stretchability, and strength by adjusting the amount of the compound.

The present invention also provides a method for forming an adhesive film, comprising:

forming a film from a composition containing a compound having a (meth)acrylate group at a terminal thereof shown by the following general formula (5), and curing the film by heating and/or light irradiation,

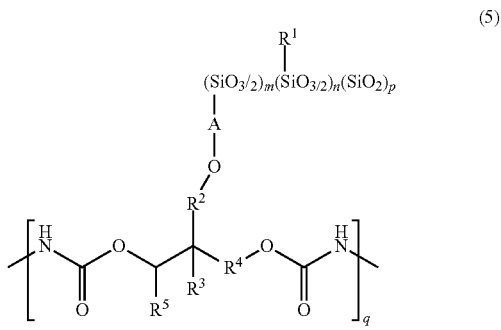

(5)

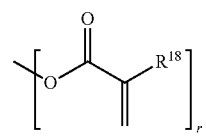

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom; $R^2$ and $R^4$ each represent a single bond, a methylene group, or an ethylene group, and the total number of carbon atoms in $R^2$ and $R^4$ is 0 to 2; $R^3$ represents a hydrogen atom or a linear alkyl group having 1 to 4 carbon atoms; $R^5$ represents a hydrogen atom or a methyl group; "A" represents a linear or branched alkylene group having 1 to 6 carbon atoms; "m", "n", and "p" are numbers satisfying $0<m\leq0.2$, $0.4\leq n<1.0$, and $0\leq p<0.5$; $R^{18}$ represents a hydrogen atom or a methyl group; and each of "q" and "r" is the number of unit in one molecule in the range of $1\leq q\leq 100$ and $1\leq r\leq 3$.

In the method for forming an adhesive film of the present invention, it is possible to combine heat curing and photo curing as described above.

In this case, it is preferable that the composition containing a compound having a (meth)acrylate group at a terminal thereof shown by the general formula (5) be formed into a film on a stretchable film.

The inventive method for forming an adhesive film can also be applied to a highly stretchable film.

The present invention also provides a urethane polymer comprising a (meth)acrylate group at a terminal thereof shown by the following general formula (5):

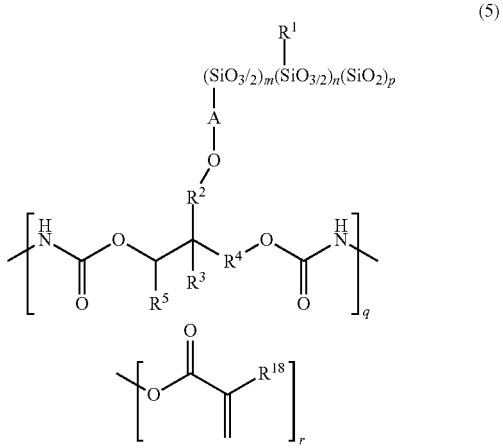

(5)

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom; $R^2$ and $R^4$ each represent a single bond, a methylene group, or an ethylene group, and the total number of carbon atoms in $R^2$ and $R^4$ is 0 to 2; $R^3$ represents a hydrogen atom or a linear alkyl group having 1 to 4 carbon atoms; $R^5$ represents a hydrogen atom or a methyl group; "A" represents a linear or branched alkylene group having 1 to 6 carbon atoms; "m" and "n" are numbers satisfying $0<m\leq0.2$ and $0.4\leq n<1.0$, "p" is a number in the range of $0.01\leq p<0.5$; $R^{18}$ represents a hydrogen atom or a methyl group; and each of "q" and "r" is the number of unit in one molecule in the range of $1\leq q\leq100$ and $1\leq r\leq3$.

The urethane polymer like this can be appropriately used for an adhesive film formed by heat curing and/or photo curing.

Advantageous Effects of Invention

As described above, the adhesive film of the present invention has excellent stretchability and strength that are equivalent to those of polyurethane, with the film surface having higher adhesion. The inventive adhesive film has higher adhesion even in a stretched condition and is capable of sticking to skin by itself or by forming this onto a highly stretchable film or a fabric. It is possible to form an adhesion pattern by printing. The inventive adhesive film can be used particularly favorably as a stretchable adhesive film that is capable of constantly sticking a bio-electrode or a sensor to a body in a use of sticking a bio-electrode and a sensor to skin in a wearable device.

DESCRIPTION OF EMBODIMENTS

As described above, it has been demanded for developing a stretchable adhesive film having excellent stretchability and strength, highly adhesive film surface, and thinner film thickness, together with a method for forming the same.

In recent wearable uses, it has been required for an adhesive with higher stretchability, higher strength, and higher repellency, as well as higher adhesion even in a thin film without irritating skin. As described above, polyurethane adhesive has sufficient stretchability and strength, but has drawbacks of lower repellency, lowering of the strength and the stretchability due to hydrolysis, and weak adhesion. Silicone adhesive has higher repellency and adhesion, but has drawbacks of lowering of the adhesion as the film gets thinner and lower strength of the adhesive film. Acrylic adhesive has higher adhesion, but has drawbacks of lower stretchability and strength.

Accordingly, the present inventors have diligently investigated to solve the foregoing subject. As a result, the inventors have found that a particularly suitable adhesive film for wearable uses is obtained from a film based on a resin that has a silsesquioxane in a side chain to bring higher repellency and adhesion, together with a urethane bond in a main chain to bring higher stretchability and strength since it is a stretchable film having excellent stretchability and strength equal to those of polyurethane as well as higher repellency and adhesion equal to those of silicone adhesive; thereby completing the present invention.

That is, the inventors have found that the film from a resin having a silsesquioxane in a side chain and a urethane bond in a main chain has higher stretchability and strength equal to those of polyurethane as well as higher repellency and adhesion, thereby being effective as a stretchable adhesive film.

Thus, the present invention is an adhesive film comprising a resin having a silsesquioxane in a side chain and a urethane bond in a main chain.

Hereinafter, the present invention will be specifically described, but the present invention is not limited thereto.

[Resin Having a Silsesquioxane in a Side Chain and a Urethane Bond in a Main Chain (Adhesive Resin)]

The resin in the inventive adhesive film is a resin having a silsesquioxane in a side chain and a urethane bond in a main chain. These resins preferably have a structure shown by the following general formula (1).

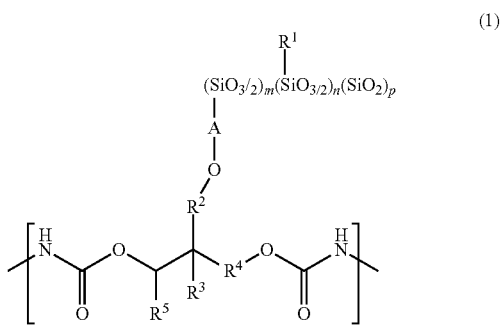

(1)

In this formula, $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom; $R^2$ and $R^4$ each represent a single bond, a methylene group, or an ethylene group, and the total number of carbon atoms in $R^2$ and $R^4$ is 0 to 2; $R^3$ represents a hydrogen atom or a linear alkyl group having 1 to 4 carbon atoms; $R^5$ represents a hydrogen atom or a methyl group; "A" represents a linear or branched alkylene group having 1 to 6 carbon atoms; and "m", "n", and "p" are numbers satisfying $0<m\leq0.2$, $0.4\leq n<1.0$, and $0\leq p<0.5$.

Here, each of the repeating units with subscripts of "m" and "n" is a repeating unit of silsesquioxane having a silicone bond of trifunctional T unit. The adhesion is further improved by introducing a repeating unit with a subscript of "p" of quadrivalent Q unit. The range of "p" is preferably $0.01 \leq p < 0.5$, further preferably $0.01 \leq p \leq 0.4$.

To achieve adhesion, it is effective to coexist a soft portion and a hard portion with higher cohesion. In the soft portion, it is effective to introduce a polyether chain as a unit for extending the chain length of urethane. A urethane bond is effective for increasing the cohesion, and the effect is further enhanced by introducing a silsesquioxane unit of the present invention. Additionally, the cohesion is increased by introducing a repeating unit with a subscript of "p" of Q unit, which is glassy form, to improve the adhesion.

In the resin having a silsesquioxane in a side chain and a urethane bond in a main chain used for the inventive adhesive film, a urethane bond is contained in the main chain. Accordingly, the inventive adhesive film has higher stretchability and strength as those of a conventional urethane adhesive film.

The resin having a silsesquioxane in a side chain and a urethane bond in a main chain is preferably a reaction product of a diol compound shown by the following general formula (2) and a compound having an isocyanate group (hereinafter, also referred to as an isocyanate compound).

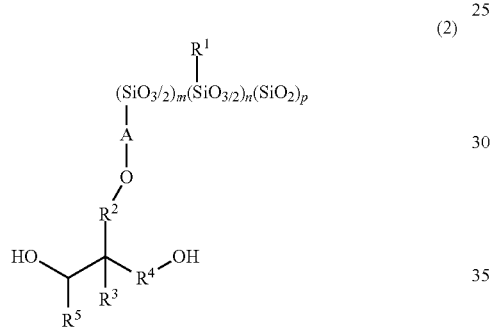

(2)

In the formula, $R^1$ to $R^5$, "A", "m", "n", and "p" have the same meanings as defined above.

Alternatively, the resin having a silsesquioxane in a side chain and a urethane bond in a main chain is preferably a reaction product of a diol compound shown by the following general formula (3) and a compound having an isocyanate group (hereinafter, also referred to as an isocyanate compound).

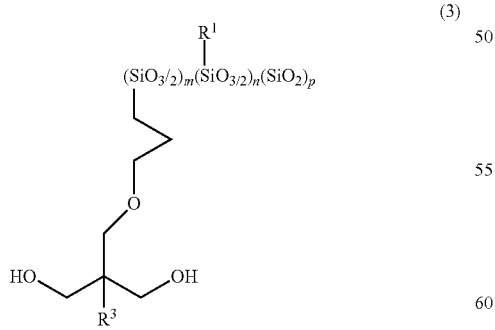

(3)

In the formula, $R^1$, $R^3$, "m", "n", and "p" have the same meanings as defined above.

The diol compound having a pendant of short chain siloxane shown by the general formula (2) can be obtained by a reaction of glycerin monoallyl ether and a short chain siloxane compound having an SiH group in the siloxane chain in the presence of a platinum catalyst, for example.

Illustrative examples of the diol compound used for obtaining a resin having a silsesquioxane in a side chain and a urethane bond in a main chain include the following.

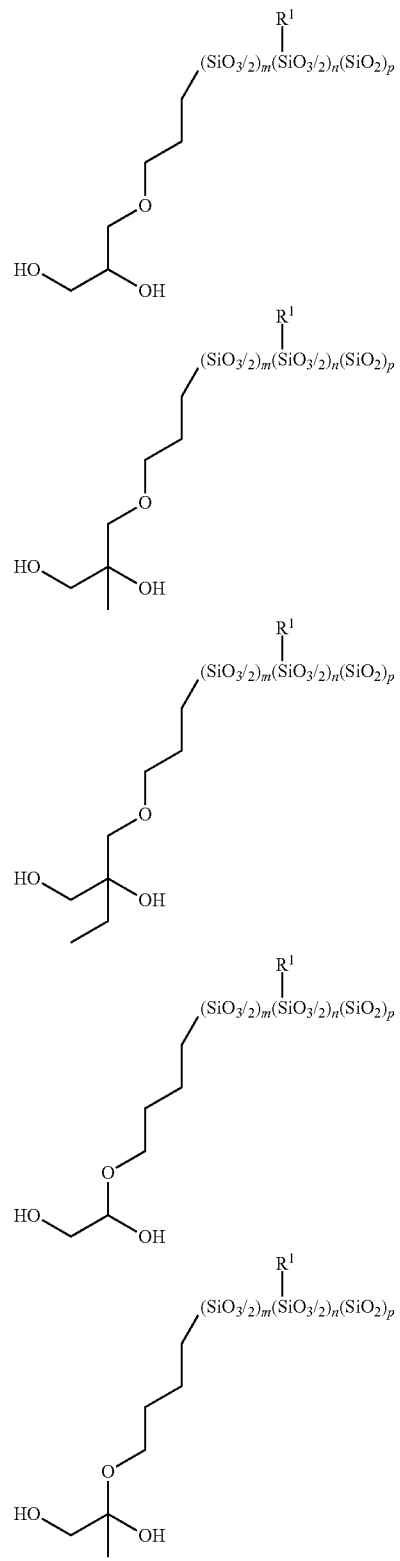

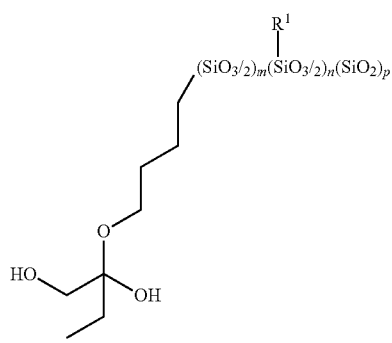
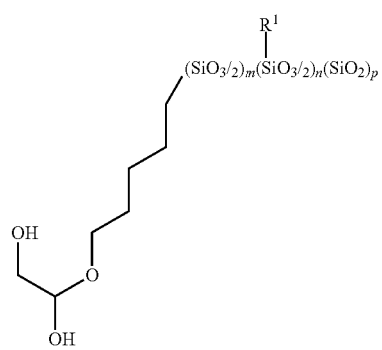
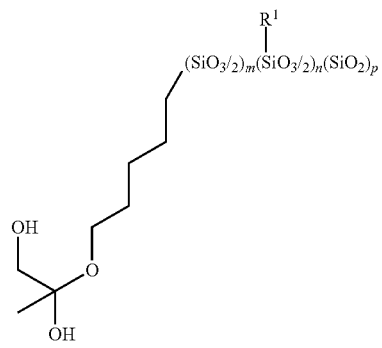
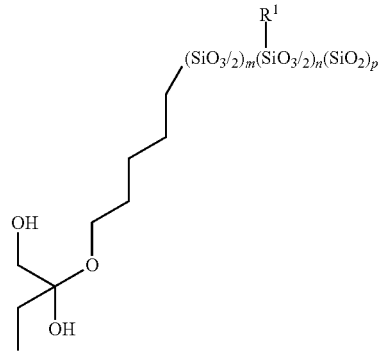
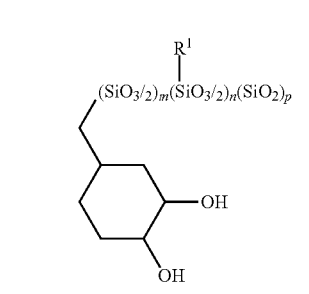
(6)
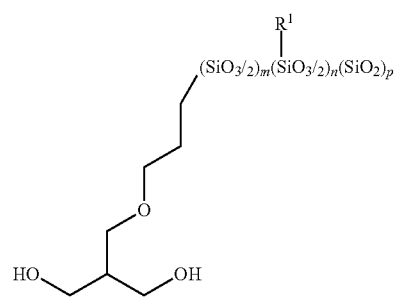
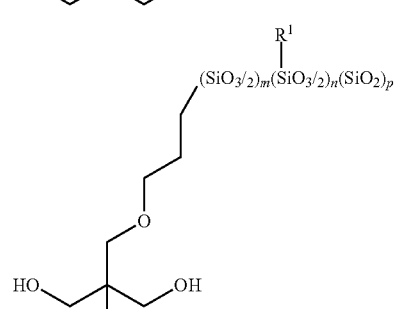
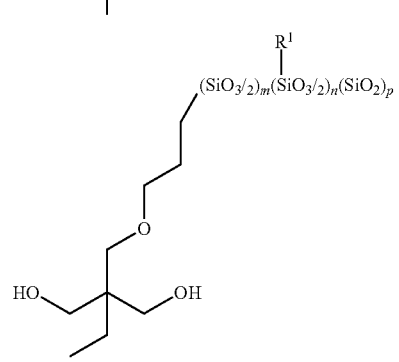
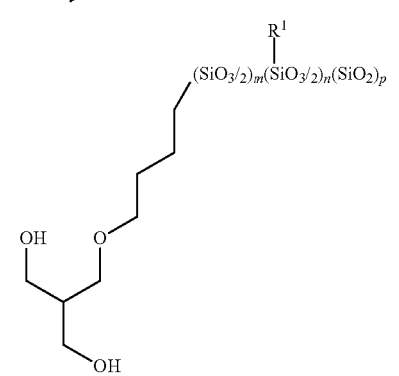
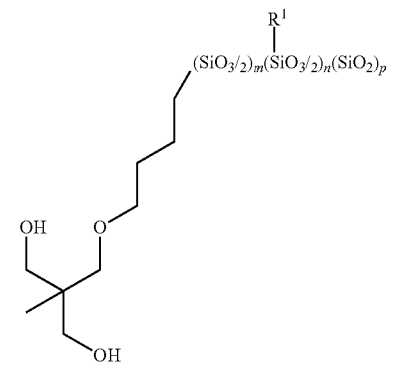

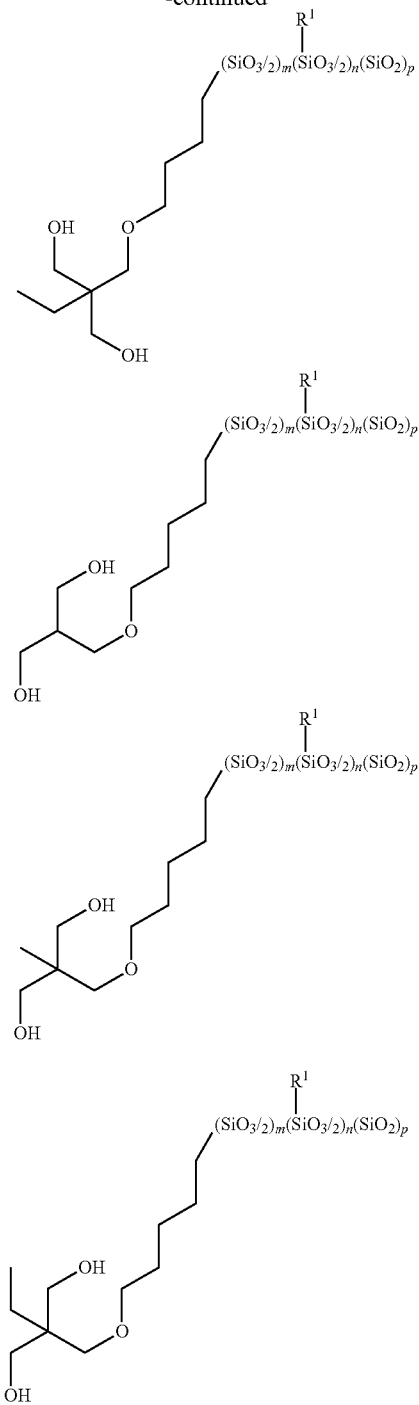

(7)

The compound of the formula (6) is synthesized by condensation of silsesquioxane using a silane compound having an epoxy group, followed by ring opening of the epoxy ring with acid and water. Alternatively, the compound is synthesized by a hydrosilylation reaction with a platinum catalyst to bond trialkoxysilane to allyloxydiol, followed by hydrolysis condensation thereof. The compound of the formula (7) is synthesized by ring opening using a silane compound having oxetane or cyclic acetal. Particularly, cyclic acetal compounds undergo a rapid ring opening reaction and is preferable thereby.

The cyclic acetal compound can be a compound shown by the following general formula (4)-1. The repeating unit with a subscript of "m" in the general formula (2) can be obtained by condensation reaction of a silane compound having an epoxy group, an oxetane group, or a cyclic acetal group as described above.

Instead of using the compound of the general formula (4)-1, the silsesquioxane containing a diol group can also be synthesized by condensation reaction of a silane compound in which trialkoxysilane has been bonded to a diol compound having a double bond such as 3-allyloxy-1,2-propanediol through hydrosilylation reaction with a platinum catalyst.

The repeating unit with a subscript of "n" and the repeating unit with a subscript of "p" can be obtained by hydrolysis condensation reaction of alkoxysilane of the following general formula (4)-2 and alkoxysilane of the following general formula (4)-3 respectively.

$$\begin{array}{c} OR^9 \\ R^8O-Si-OR^{10} \end{array} \quad (4)\text{-}1$$

(structure with propyl-O-CH2 linker to cyclic acetal ring bearing $R^3$, $R^6$, $R^7$)

$$\begin{array}{c} OR^{12} \\ R^{11}O-Si-OR^{13} \\ R^1 \end{array} \quad (4)\text{-}2$$

$$\begin{array}{c} OR^{15} \\ R^{14}O-Si-OR^{16} \\ OR^{17} \end{array} \quad (4)\text{-}3$$

In the formulae, $R^1$ and $R^3$ have the same meanings as defined above; $R^6$ and $R^7$ each represent a hydrogen atom, a linear, branched, or cyclic alkyl group having 1 to 10 carbon atoms, an alkenyl group having 2 to 10 carbon atoms, an alkynyl group having 2 to 10 carbon atoms, or an aryl group having 6 to 10 carbon atoms; $R^8$ to $R^{17}$ each represent a linear, branched, or cyclic alkyl group having 1 to 6 carbon atoms.

Additionally, the resin having a silsesquioxane in a side chain and a urethane bond in a main chain is preferably a cured material obtained by curing a compound having a (meth)acrylate group at the terminal shown by the following general formula (5).

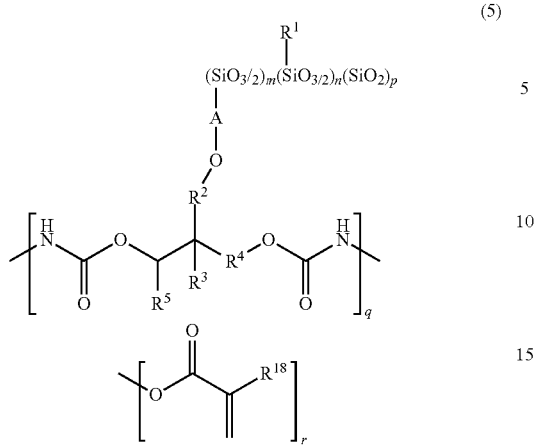

(5)

In the formula, $R^1$ to $R^5$, "A", "m", "n", and "p" have the same meanings as defined above. $R^{18}$ represents a hydrogen atom or a methyl group; and each of "q" and "r" is the number of unit in one molecule in the range of $1 \leq q \leq 100$ and $1 \leq r \leq 3$.

Illustrative examples of the compound having an isocyanate group to be used for a reaction with the diol compound shown by the general formula (2) include the following.

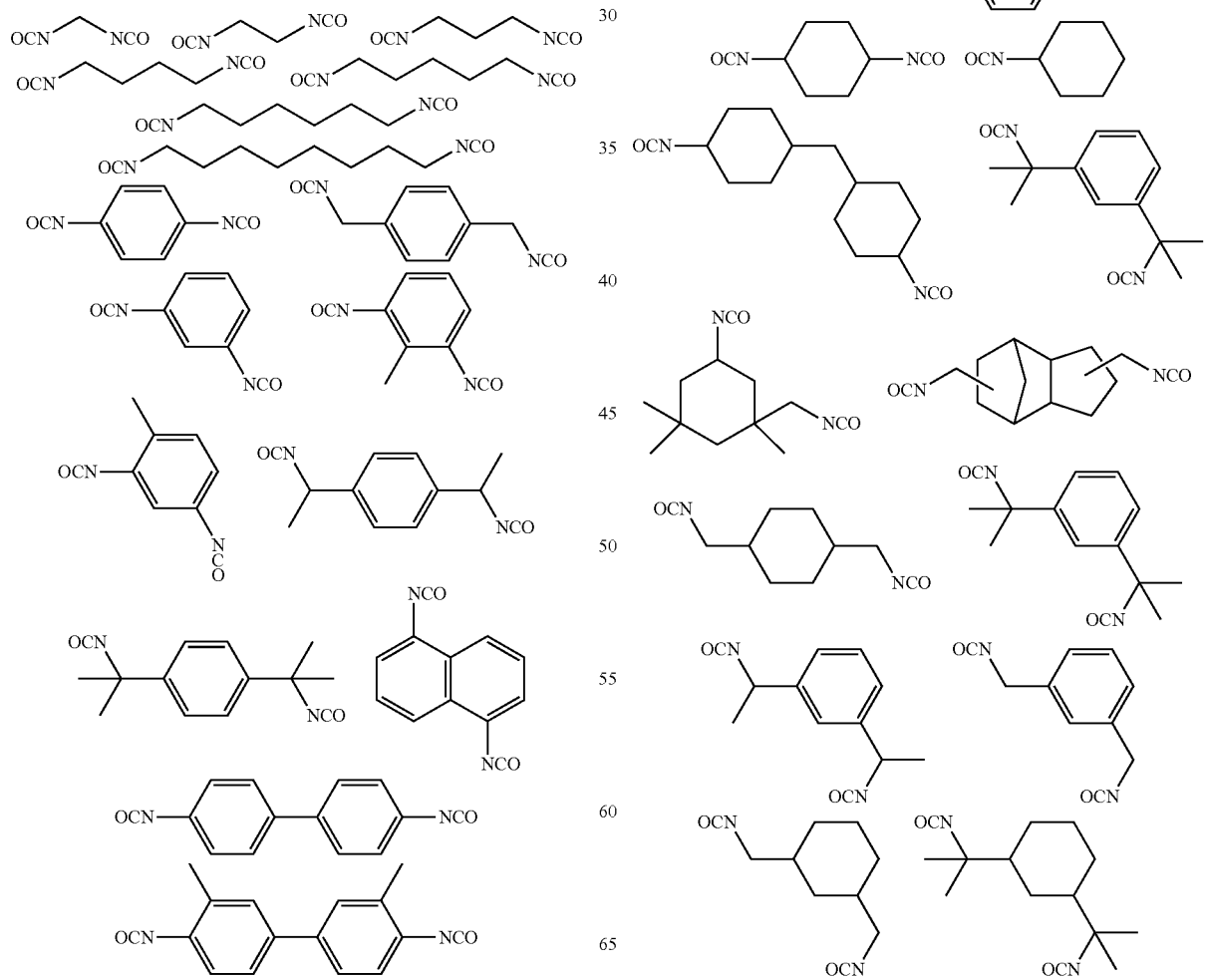

-continued
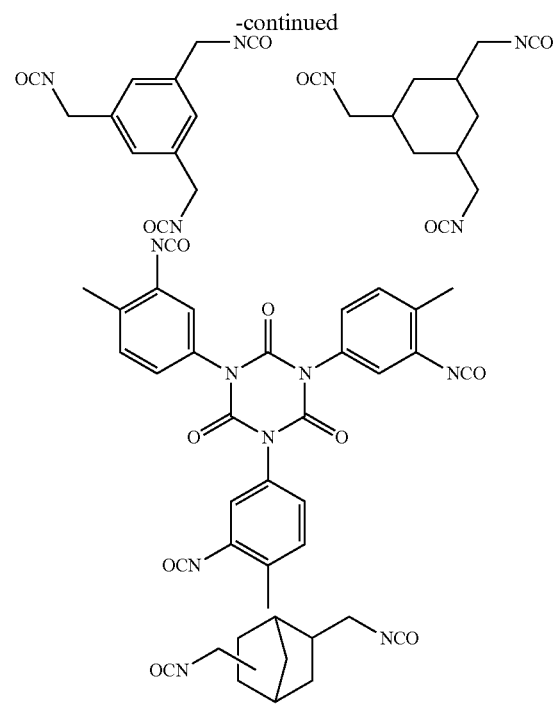
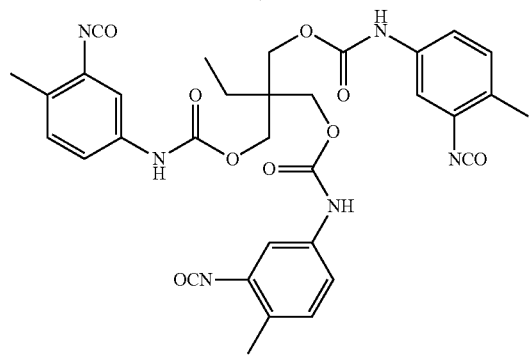
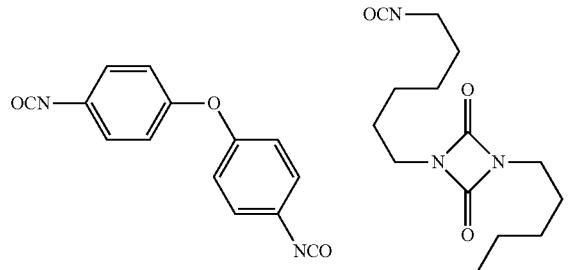
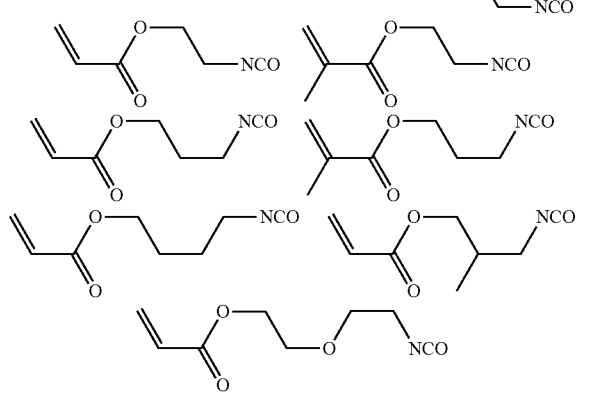
-continued
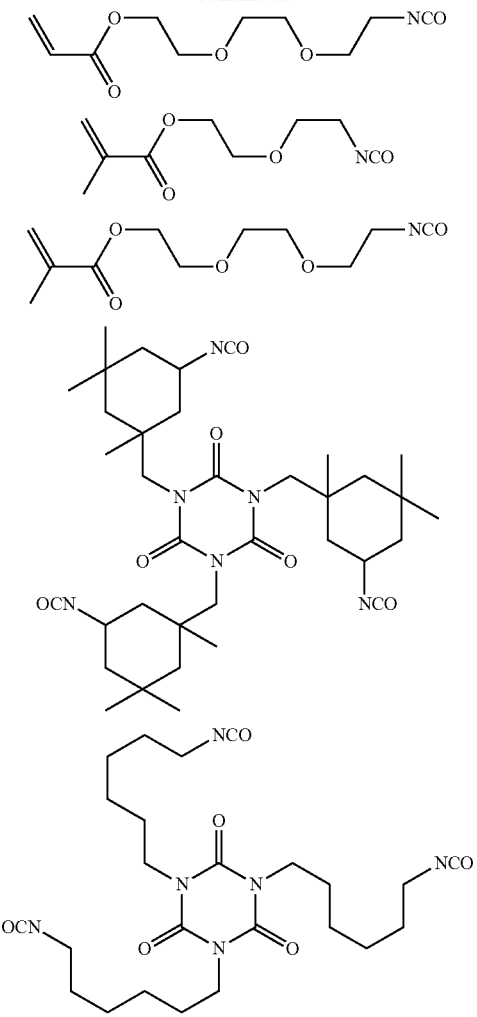
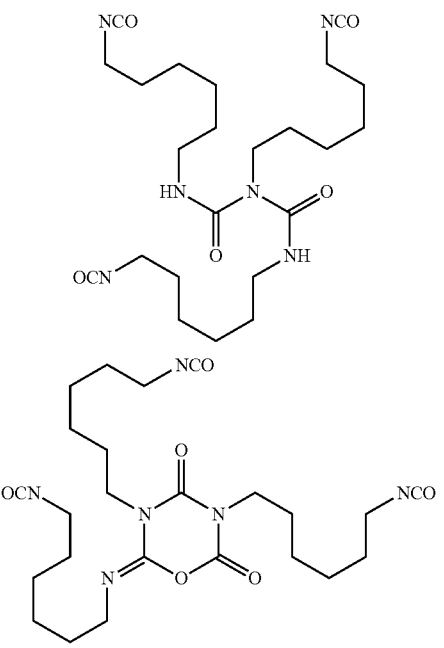

-continued

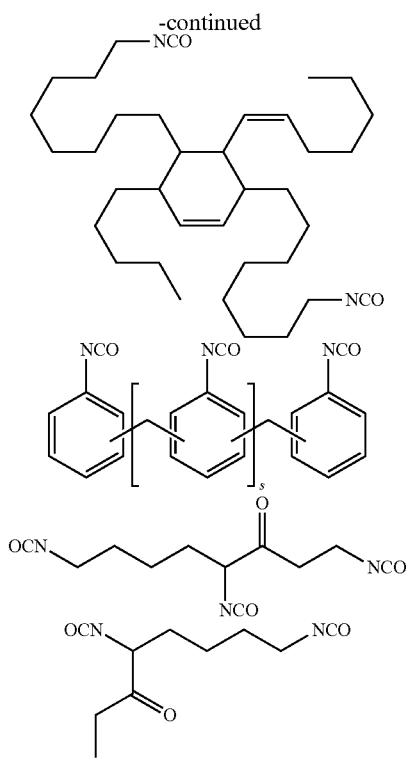

In the formula, "s" is an integer of 1 or more.

Among the above compounds having isocyanate groups, the compound having a (meth)acrylate group can give a compound having a (meth)acrylate group at the terminal shown by the general formula (5) through reaction with a diol compound shown by the general formula (2).

The compounds having isocyanate groups described above are highly reactive to the diol compound shown by the general formula (2) (silicone pendant diol), and is sometimes difficult to control the reaction thereby. Compounds having isocyanate groups have to be stored with sufficient care such as preventing humidity sufficiently since the isocyanate group can be inactivated during the storage by reaction with moisture in the air. Accordingly, a compound having a blocked isocyanate, in which the isocyanate group is protected by a substituent, can be used for preventing these phenomena.

The blocked isocyanate group is a blocked group that is deprotected by heating to be an isocyanate group. Illustrative examples thereof include isocyanate groups substituted by alcohol, phenol, thioalcohol, imine, ketimine, amine, lactam, pyrazole, oxime, and β-diketone.

A catalyst may be added to decrease the temperature for deprotecting the blocked isocyanate groups. Illustrative examples of the catalyst include organic tin such as dibutyltin dilaurate, bismuth salt, and zinc carboxylate such as zinc 2-ethylhexanoate and zinc acetate.

In particular, JP 2012-152725A discloses that the temperature of deprotection reaction can be decreased by including zinc carboxylate of α,β-unsaturated zinc carboxylate as a blocked isocyanate dissociation catalyst.

In addition to the diol compound having a silsesquioxane pendant shown by the general formula (2) and a compound having an isocyanate group, a compound having a plurality of hydroxy groups can be added. By adding the hydroxy group-containing compound like this, extension of the chain length and crosslinking between the molecules are performed.

Illustrative examples of the compound having a plurality of hydroxy groups include the following.

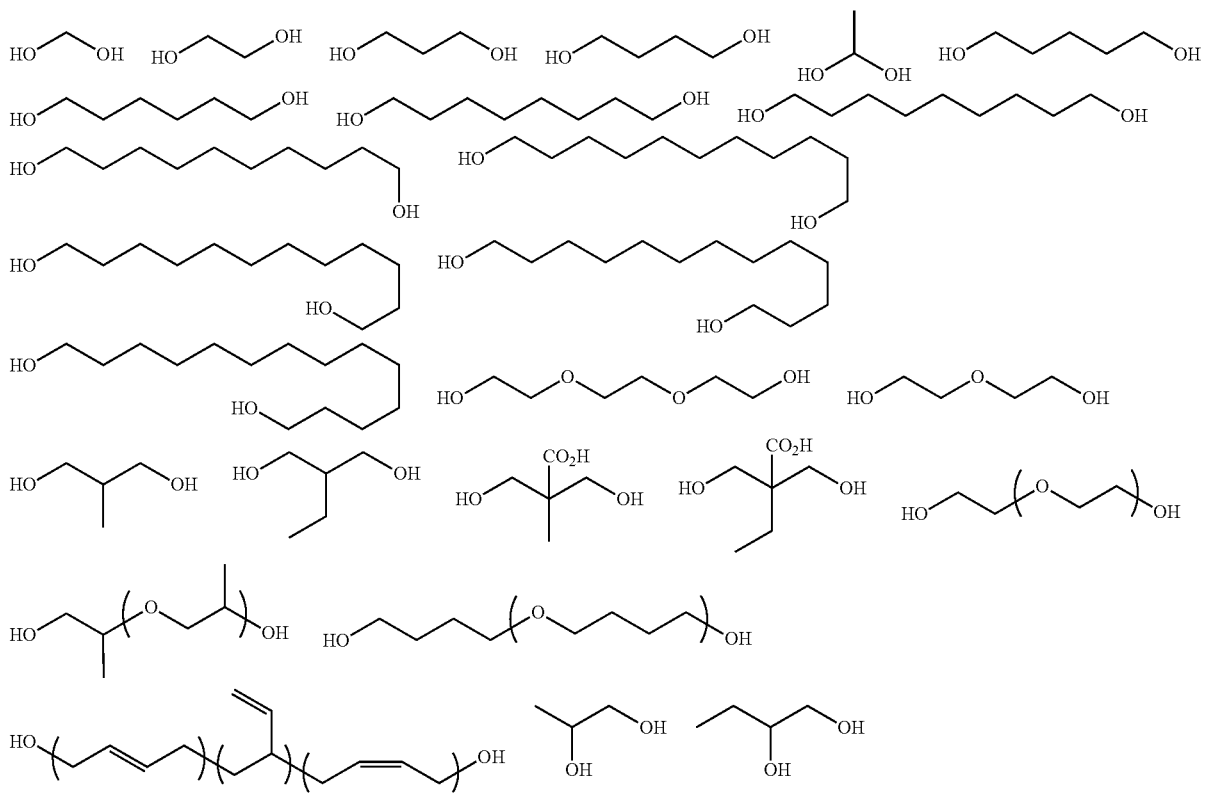

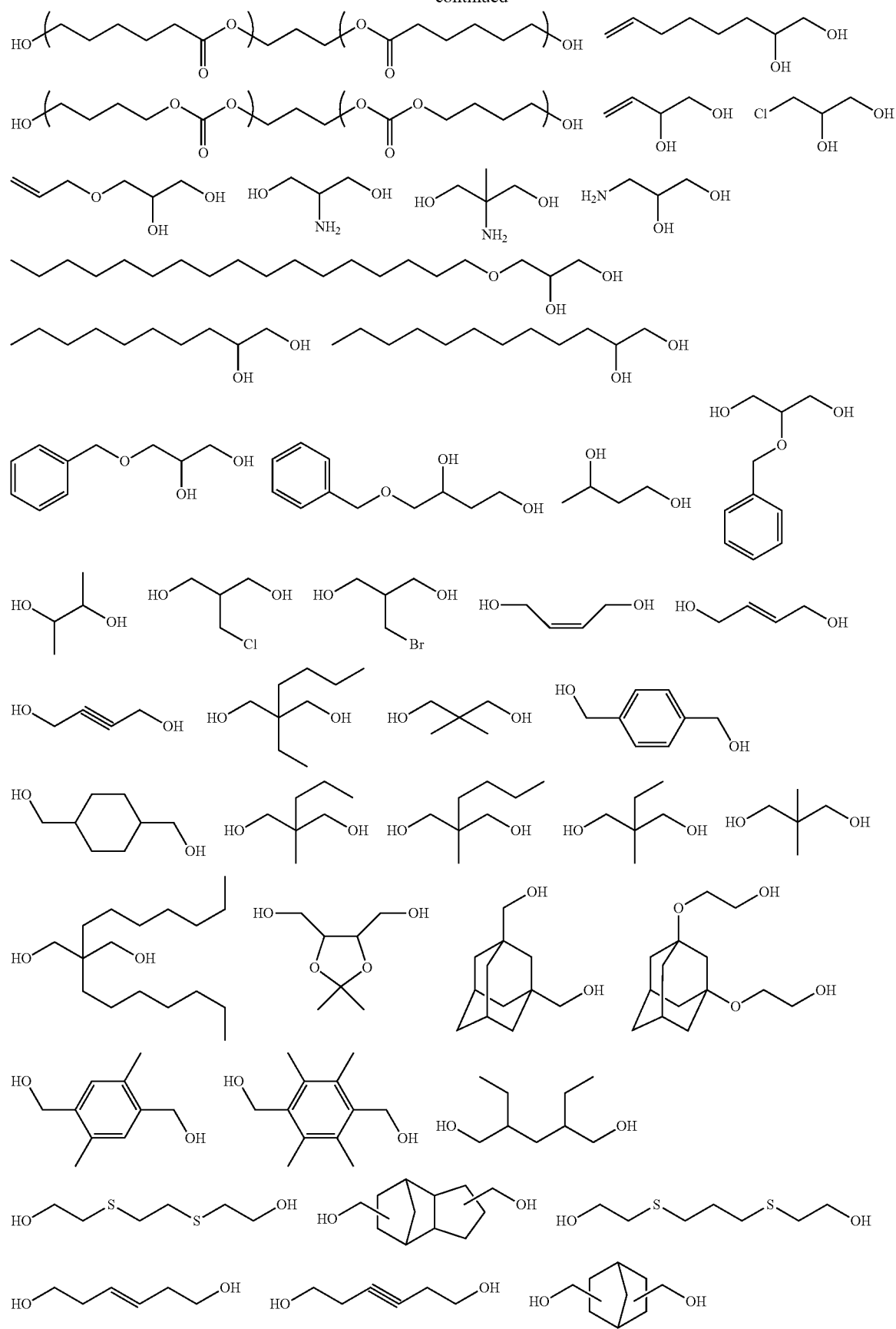
-continued

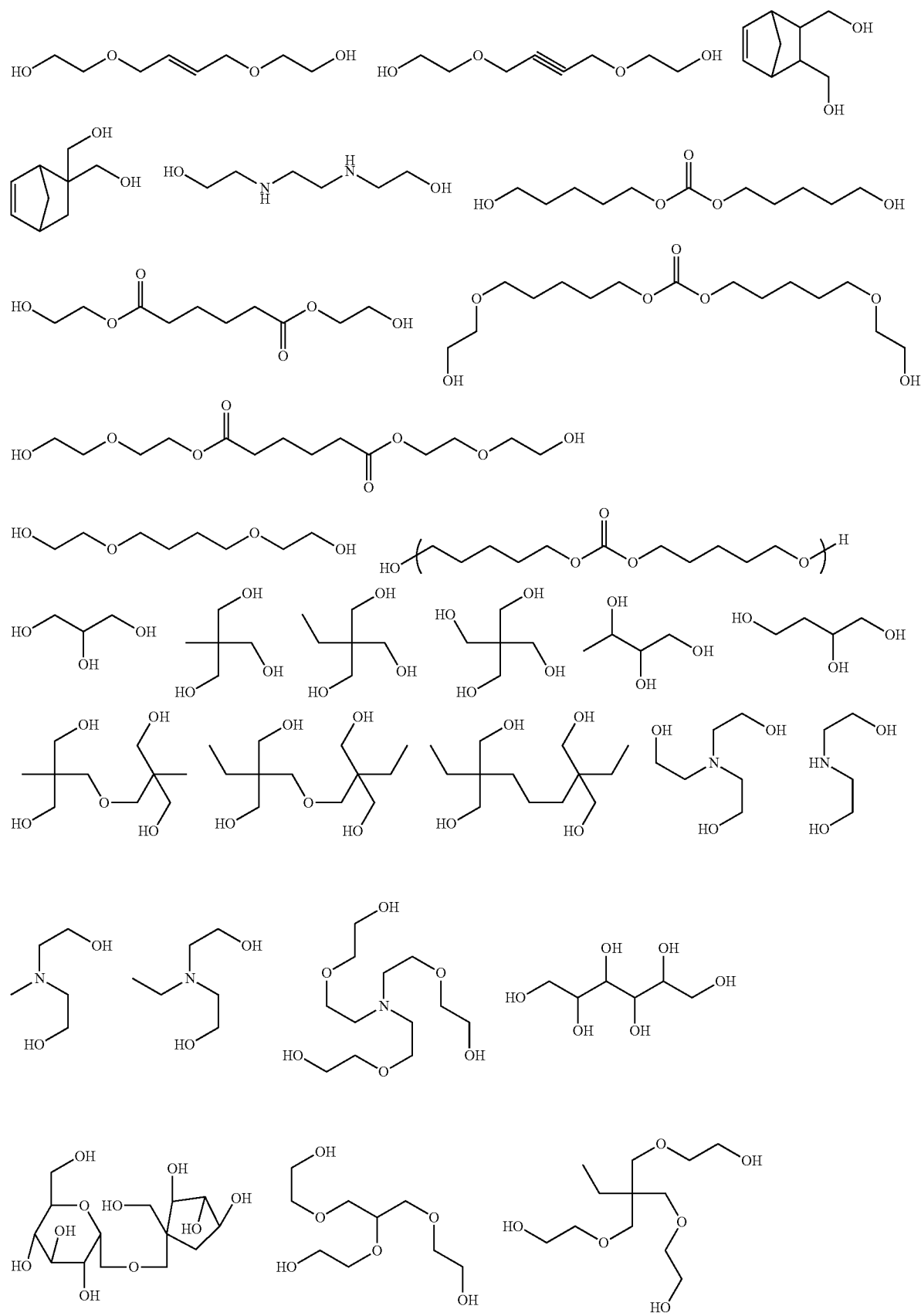

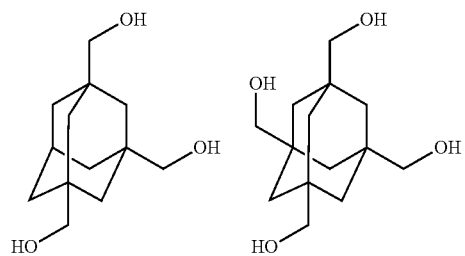
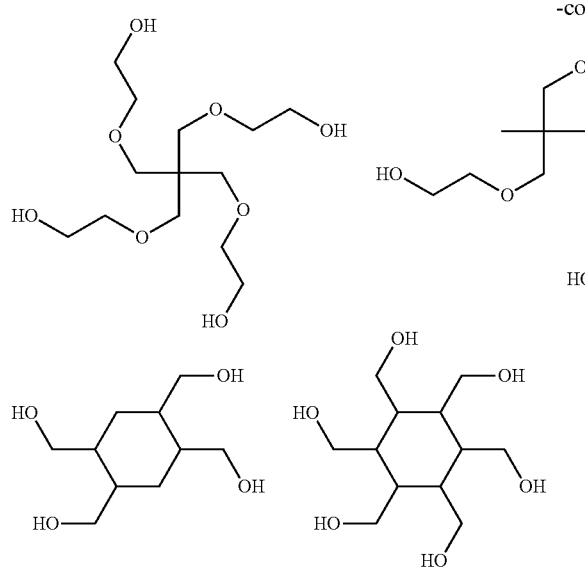

Additionally, a compound having an amino group can also be added. When an isocyanate group reacts with an amino group, a urea bond is formed. The moiety of a urethane bond and a urea bond is called as a hard segment, and improves the strength through their hydrogen bonds. The strength is successfully improved by the addition of urea bonds not only by urethane bonds.

The resin having a silsesquioxane in a side chain and a urethane bond in a main chain preferably has a weight average molecular weight of 500 or more. The resin like this can be suitably used for the adhesive film of the present invention. The resin having a silsesquioxane in a side chain and a urethane bond in a main chain preferably has a weight average molecular weight of 500,000 or less as an upper limit.

The living body contact layer (the adhesive film) preferably has adhesion in a range of 0.1 N/25 mm or more and 20 N/25 mm or less. The adhesion is commonly measured by the method shown in JIS Z 0237, in which a metal substrate such as a stainless steel (SUS) substrate or a polyethylene terephthalate (PET) substrate can be used as a base material or, alternatively, human skin can be used for measuring. Human skin has lower surface energy compared to metals and various plastics, which energy is as low as that of Teflon (registered trade mark), and is hard to adhere.

The adhesive layer (the adhesive film) preferably has a thickness of 0.1 μm or more and 1 mm or less, more preferably 0.2 μm or more and 0.5 mm or less. A thinner adhesive layer has lower adhesion, but has improved flexibility and lighter weight to improve compatibility with skin. The thickness of the adhesive layer can be selected based on the balance of adhesion and texture to skin.

The inventive adhesive film is preferably used on a surface that is in contact with skin, for example, in a stretchable film provided with an electrocardiograph device. The inventive adhesive film can be suitably used for these uses particularly.

The inventive adhesive film described above has excellent stretchability and strength that are equal to those of polyurethane, together with the film surface having excellent adhesion.

<Method for Forming an Adhesive Film>

The present invention also provides a method for forming the adhesive film in which at least a diol compound shown by the general formula (2) and a compound having an isocyanate group are mixed to prepare a mixture, and then the mixture is formed into a film and is cured by heating.

An illustrative example of the method for forming an adhesive film like this includes a method of mixing a diol compound shown by the general formula (2), a protected or unprotected isocyanate compound, and a compound having a plurality of hydroxy groups for extending a chain length or crosslinking, together with a compound having an amino group in some cases to prepare a mixture, followed by applying this mixture onto a substrate for peeling to form a film, which is cured by heating.

In this method, a polymer network is formed by increasing the molecular weight while forming urethane bonds through reaction of isocyanate and alcohol. In case of adding a compound that has three or more of hydroxy groups or isocyanate groups, crosslinking reaction proceeds to lower the stretchability, but improve the film strength. Accordingly, it is possible to control the hardness, the stretchability, and the strength by controlling the amount of the compound having two or three hydroxy groups or isocyanate groups. Additionally, an independent stretchable film can be obtained by peeling the film from the substrate after being cured.

Regarding the molar ratio of the hydroxy groups and isocyanate groups in the mixture, it is preferable that the hydroxy groups and isocyanate groups be in the same molar amount, or the molar number of hydroxy groups be larger, that is, the value of the molar number of hydroxy groups divided by the molar number of isocyanate groups be 1 or more. When the molar number of isocyanate groups is smaller, carbon dioxide cannot be formed through the reaction of excess isocyanate groups with water, thereby allowing the film to prevent causing of voids due to foaming. In general, foamed urethane is produced with excess isocyanate groups. In a stretchable film of the present invention, however, the film is preferably free from void due to foaming since higher strength is required.

After forming a resin having a silsesquioxane in a side chain and a urethane bond in a main chain of the inventive adhesive film in condition that the molar number of alcohol groups is larger than that of isocyanate groups as described above, the terminal of the polymer sometimes has a moiety in which a urethane bond is formed at only one side of the diol compound shown by the general formula (2) without forming a structure in which urethane bonds are formed at the both sides as in the structure shown by the general formula (1). In this case, the terminal of the polymer has a structure shown by the following general formula (1').

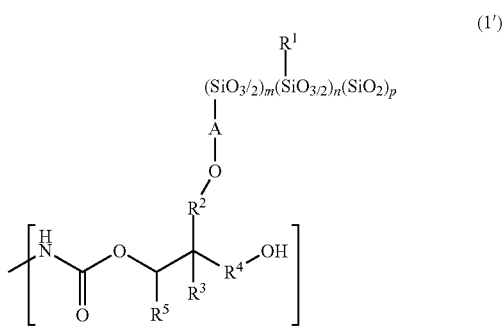

In the formula, $R^1$ to $R^5$, "A", "m", "n", and "p" have the same meanings as defined above.

The heating temperature is generally set to in the range of room temperature to 200° C. Preferably, the temperature is set to in the range of 40 to 160° C. for the time of 5 seconds to 60 minutes. The heat curing is performed either by coating one side of a film with a peeling film or by coating the both sides of a film with peeling films. It is preferable to coat one side in curing while being wound on a roll, and the both sides in batch curing, but the method is not limited thereto.

In case of synthesizing the polymer having a (meth)acrylate group at the terminal shown by the general formula (5), a diol compound having a silsesquioxane pendant, a diol compound for extending a chain length, and a (meth)acrylate compound having a hydroxy group are mixed; are mixed with a diisocyanate compound; and are polymerized with heating.

In order to enhance the reactivity of an isocyanate group and a hydroxy group, it is possible to add a catalyst described in paragraphs 0041 and 0042 and/or a solvent described in paragraph 0043 of JP 2017-186691A. The reaction temperature is in the range of room temperature to 120° C., and the reaction time is in the range of 10 minutes to 20 hours.

The present invention also provides a method for forming an adhesive, including: forming a film from a composition containing a compound having a (meth)acrylate group at the terminal shown by the general formula (5), and curing the film by heating and/or light irradiation.

Concretely, the adhesive film can be formed using a urethane polymer having a polymer terminal of (meth)acrylate produced by polymerization of a mixture of a diol compound shown by the general formula (2), a protected or unprotected isocyanate compound, and a compound having a plurality of hydroxy groups for extending the chain length or crosslinking. In this case, (meth)acrylate is crosslinked by reaction of radical. As a method for radical crosslinking, addition of a radical generator is desirable. The radical generator includes a thermal-radical generator, which generates a radical by thermal decomposition, and a photo-radical generator, which generates a radical by light irradiation.

Illustrative examples of the thermal-radical generator include an azo radical generator and a peroxide radical generator. Illustrative examples of the azo radical generator include 2,2'-azobis(isobutyronitrile) (AIBN), 2,2'-azobis(2,4-dimethylvaleronitrile), dimethyl 2,2'-azobis(2-methylpropionate), 2,2'-azobis(4-methoxy-2,4-dimethylvaleronitrile), 2,2'-azobis(cyclohexane-1-carbonitrile), and 4,4'-azobis(4-cyanovaleric acid). Illustrative examples of the peroxide radical generator include benzoyl peroxide, decanoyl peroxide, lauroyl peroxide, succinic acid peroxide, t-butyl peroxy-2-ethylhexanoate, t-butyl peroxy pivalate, and 1,1,3,3-tetramethylbutyl peroxy-2-ethylhexanoate.

Illustrative examples of the photo-radical generator include acetophenone, 4,4'-dimethoxybenzyl, benzyl, benzoin, benzophenone, 2-benzoylbenzoic acid, 4,4'-bis(dimethylamino)benzophenone, 4,4'-bis(diethylamino)benzophenone, benzoin methyl ether, benzoin ethyl ether, benzoin isopropyl ether, benzoin butyl ether, benzoin isobutyl ether, 4-benzoylbenzoic acid, 2,2'-bis(2-chlorophenyl)-4,4',5,5'-tetraphenyl-1,2'-biimidazole, methyl 2-benzoylbenzoic acid, 2-(1,3-benzodioxole-5-yl)-4,6-bis(trichloromethyl)-1,3,5-triazine, 2-benzyl-2-(dimethylamino)-4'-morpholinobutylophenone, 4,4'-dichlorobenzophenone, 2,2-diethoxyacetophenone, 2,2-dimethoxy-2-phenylacetophenone, 2,4-diethylthioxanthen-9-one, diphenyl(2,4,6-trimethylbenzoyl)phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methylpropiophenone, 2-isonitrosopropiophenone, 2-phenyl-2-(p-toluenesulfonyloxy)acetophenone (BAPO), and camphorquinone.

The loading amount of the thermal-radical generator or the photo-radical generator is preferably in the range of 0.1 to 50 parts by mass based on 100 parts by mass of the resin having a silsesquioxane in a side chain and a urethane bond in a main chain.

It is also possible to add a crosslinking agent that has a plurality of (meth)acrylate or thiol. This makes it possible to improve the efficiency of radical crosslinking.

When an adhesive film is formed using a compound that has a (meth)acrylate group at the terminal, the curing can be performed by combining heat curing and photo curing.

The adhesive film can be formed by the method of applying the mixture onto a planer substrate or a roll. Illustrative examples of the method for applying the mixture include spin coating, bar coating, roll coating, flow coating, dip coating, spray coating, and doctor coating. The coating is preferably performed so as to have a coating film thickness of 0.1 μm to 2 mm.

For encapsulating a part with unevenness, preferable methods include roll coating and spray coating, or a method for coating a part that requires to be coated by screen printing, etc. In order to perform various coating or printing, the viscosity of the mixed solution (mixture) have to be controlled. When lower viscosity is required, an organic solvent may be added; when higher viscosity is required, filler such as silica is mixed.

The organic solvent is preferably an organic solvent with the boiling point being in the range of 115 to 200° C. at atmospheric pressure. It is preferable to use one or more organic solvents selected from 2-octanone, 2-nonanone, 2-heptanone, 3-heptanone, 4-heptanone, 2-hexanone, 3-hexanone, diisobutyl ketone, methylcyclohexanone, acetophenone, methylacetophenone, propyl acetate, butyl acetate, isobutyl acetate, amyl acetate, butenyl acetate, isoamyl acetate, phenyl acetate, propyl formate, butyl formate, isobutyl formate, amyl formate, isoamyl formate, methyl valerate, methyl pentenoate, methyl crotonate, ethyl crotonate, propylene glycol monomethyl ether, ethylene glycol monomethyl ether, propylene glycol monoethyl ether, ethylene glycol monoethyl ether, propylene glycol dimethyl ether, diethylene glycol dimethyl ether, propylene glycol monomethyl ether acetate, and propylene glycol monoethyl ether acetate.

In case of curing of the compound that has a (meth)acrylate group at the terminal by heating, the heat curing can be performed with a hot plate, in an oven, or by irradiation of far infrared ray, for example. The heating condition is preferably at 30 to 150° C. for 10 seconds to 60 minutes, more preferably at 50 to 120° C. for 30 seconds to 20 minutes. The baking may be performed in any environment such as in the atmosphere, in an inert gas, or in vacuum.

In case of curing of the compound that has a (meth)acrylate group at the terminal by light irradiation, the curing by light irradiation is preferably performed with a light having a wavelength of 200 to 500 nm. As the light source, a halogen lamp, a xenon lamp, excimer laser, and LED can be used, for example. Irradiation with electron beam is also preferable. The irradiation quantity is preferably in the range of 1 mJ/cm$^2$ to 100 J/cm$^2$.

The composition containing a compound having a (meth)acrylate group at the terminal shown by the general formula (5) may be formed into a film on a stretchable film.

The present invention also provides a urethane polymer having a (meth)acrylate group at the terminal shown by the general formula (5).

The urethane polymer like this is suitably used for an adhesive film formed by using heat curing and/or photo curing.

The inventive method for forming an adhesive film described above makes it possible to easily form an adhesive film that has excellent stretchability and strength equivalent to or superior to those of polyurethane, with the film surface having higher adhesion.

EXAMPLE

Hereinafter, the present invention will be specifically described with reference to Examples and Comparative Examples, but the present invention is not limited thereto. Incidentally, the weight average molecular weight (Mw) represents a weight average molecular weight in terms of polystyrene determined by gel permeation chromatography (GPC).

The following shows syntheses of silicone pendant diol compounds-1 and 2 blended to a composition for forming an adhesive film (referred to as a composition below).

A liquid mixture of 6.7 g of trimethoxysilane monomer substituted by the following acetonide, 26.5 g of isobutyltrimethoxysilane, and 4.5 g of tetramethoxysilane was added dropwise to a solution of a mixture of 60 g of acetonitrile and 1.2 g of oxalic acid at 30° C. over 1 hour. This was subjected to stirring for 12 hours to synthesize a precursor of silsesquioxane and to form diol groups simultaneously due to ring opening reaction of the acetal, followed by adding 700 g of ethyl acetate and washing with water for three times with a separatory funnel. Then, 80 g of dimethylformamide and 160 g of toluene were added thereto, and condensation reaction of remained silanol was performed by adding 1 g of potassium hydroxide and heating at 135° C. for 30 minutes. To this, 500 g of ethyl acetate was added, and washing with water was performed for three times with a separatory funnel. PGMEA was added thereto, and the solvents other than PGMEA were evaporated at 40° C. to prepare a 30 mass % solution of Silsesquioxane (SSQ)-pendant diol compound-1 in PGMEA. According to the same method, in which the isobutyltrimethoxysilane monomer was replaced by cyclohexyltrimethoxysilane, a solution of the following Silsesquioxane (SSQ)-pendant diol compound-2 in PGMEA was prepared.

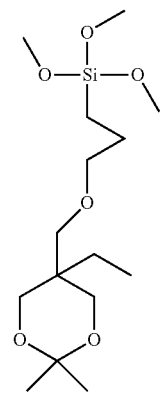 [SMILES: CCC1(COCCC[Si](OC)(OC)OC)COC(C)(C)OC1]

SSQ-Pendant Diol Compounds

The repeating numbers in the formulae each represent the average value.

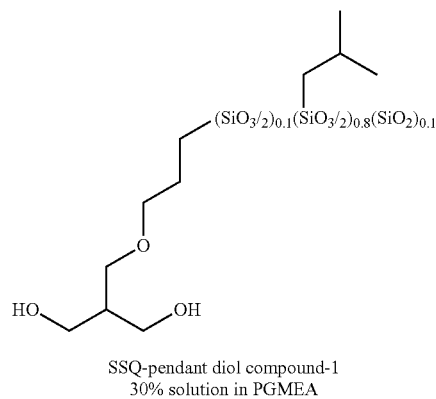

SSQ-pendant diol compound-1
30% solution in PGMEA

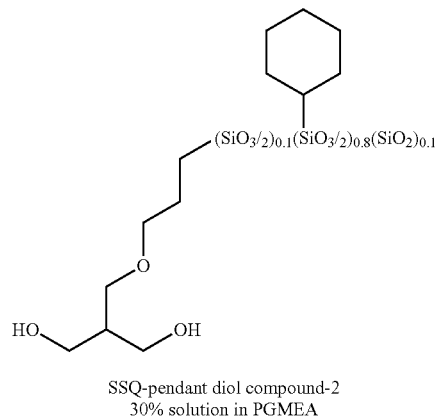

SSQ-pendant diol compound-2
30% solution in PGMEA

Synthesis of SSQ-Pendant urethane-(meth)acrylate-1

In a 100 ml flask, 30 g of the SSQ-pendant diol compound-1 solution, 20 g of polypropylene glycol, 1.2 g of hydroxyethyl acrylate, and 0.02 g of dibutyltin laurate were mixed at room temperature under a nitrogen atmosphere. After a dropwise addition of 4 g of isophorone diisocyanate, the temperature was raised to 80° C. to perform the reaction for 5 hours. The reaction was concluded at the point when the absorption of isocyanate was disappeared in the FT-IR, followed by cooling to give SSQ-pendant urethane-(meth) acrylate-1. The composition of the polymer was identified by $^1$H-NMR. The Mw and Mn are values in terms of polystyrene determined by GPC using tetrahydrofuran (THF) as a solvent.

Synthesis of SSQ-Pendant urethane-(meth)acrylate-2

In a 100 ml flask, 30 g of the SSQ-pendant diol compound-2 solution, 20 g of polybutylene glycol, 1.2 g of hydroxyethyl acrylate, and 0.02 g of dibutyltin laurate were mixed at room temperature under a nitrogen atmosphere. After a dropwise addition of 3.2 g of hexamethylene diisocyanate, the temperature was raised to 80° C. to perform the reaction for 5 hours. The reaction was concluded at the point when the absorption of isocyanate was disappeared in the FT-IR, followed by cooling to give SSQ-pendant urethane-(meth)acrylate-2. The composition of the polymer was identified by $^1$H-NMR. The Mw and Mn are values in terms of polystyrene determined by GPC using tetrahydrofuran (THF) as a solvent.

Synthesis of SSQ-Pendant urethane-(meth)acrylate-3

In a 100 ml flask, 15 g of the SSQ-pendant diol compound-2 solution, 10 g of polybutylene glycol, 1.2 g of hydroxyethyl acrylate, and 0.02 g of dibutyltin laurate were mixed at room temperature under a nitrogen atmosphere. After a dropwise addition of 4.0 g of norbornane diisocyanate, the temperature was raised to 80° C. to perform the reaction for 5 hours. The reaction was concluded at the point when the absorption of isocyanate was disappeared in the FT-IR, followed by cooling to give SSQ-pendant urethane-(meth)acrylate-3. The composition of the polymer was identified by $^1$H-NMR. The Mw and Mn are values in terms of polystyrene determined by GPC using tetrahydrofuran (THF) as a solvent.

Synthesis of SSQ-Pendant urethane-(meth)acrylate-4

In a 100 ml flask, 15 g of the SSQ-pendant diol compound-1 solution, 15 g of the SSQ-pendant diol compound-2 solution, 20 g of polybutylene glycol, 1.2 g of hydroxyethyl acrylate, and 0.02 g of dibutyltin laurate were mixed at room temperature under a nitrogen atmosphere. After a dropwise addition of 3.2 g of hexamethylene diisocyanate, the temperature was raised to 80° C. to perform the reaction for 5 hours. The reaction was concluded at the point when the absorption of isocyanate was disappeared in the FT-IR, followed by cooling to give SSQ-pendant urethane-(meth)acrylate-4. The composition of the polymer was identified by $^1$H-NMR. The Mw and Mn are values in terms of polystyrene determined by GPC using tetrahydrofuran (THF) as a solvent.

Synthesis of Comparative urethane-(meth)acrylate-1

In a 100 ml flask, 20 g of polypropylene glycol, 1.2 g of hydroxyethyl acrylate, and 0.02 g of dibutyltin laurate were mixed at room temperature under a nitrogen atmosphere. After a dropwise addition of 4 g of isophorone diisocyanate, the temperature was raised to 80° C. to perform the reaction for 5 hours. The reaction was concluded at the point when the absorption of isocyanate was disappeared in the FT-IR, followed by cooling to give Comparative urethane-(meth)acrylate-1. The composition of the polymer was identified by $^1$H-NMR. The Mw and Mn are values in terms of polystyrene determined by GPC using tetrahydrofuran (THF) as a solvent.

Shown in the following are SSQ-pendant urethane-(meth)acrylates-1 to 4 and Comparative urethane-(meth)acrylate-1, which were obtained as described above, each blended to a composition as a compound having (meth)acrylate groups at the terminals.

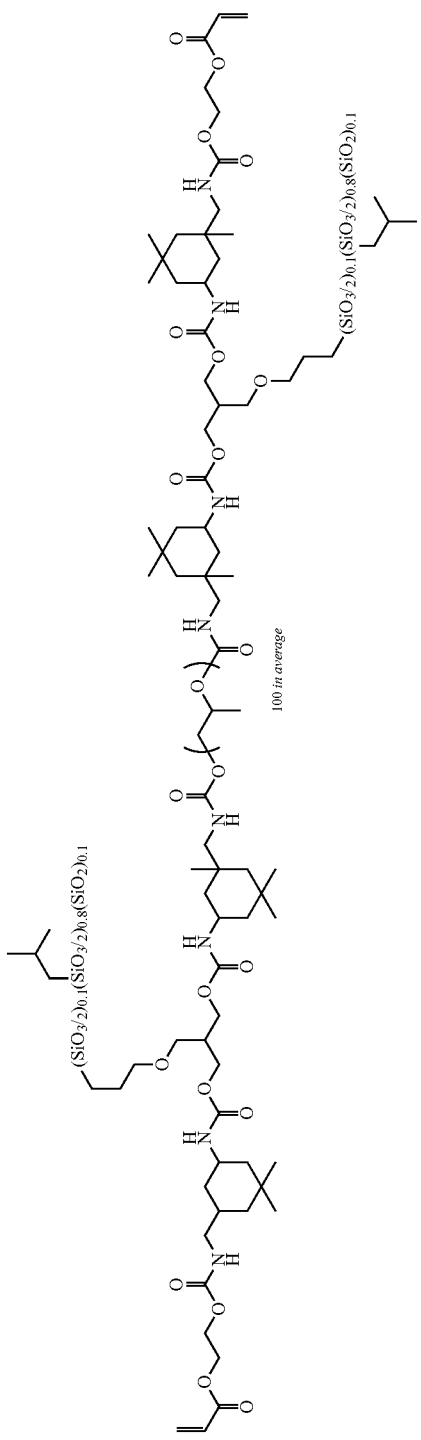
SSQ-pendant urethane-(meth)acrylate-1
Mw: 21000, Mw/Mn: 2.21
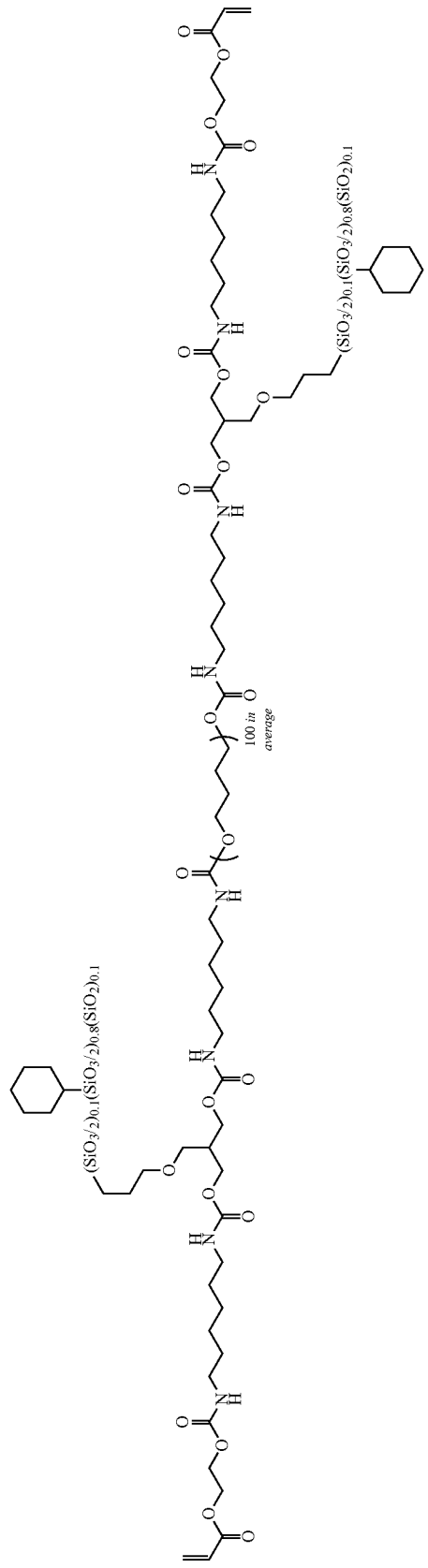
SSQ-pendant urethane-(meth)acrylate-2
Mw: 26000, Mw/Mn: 2.30

-continued
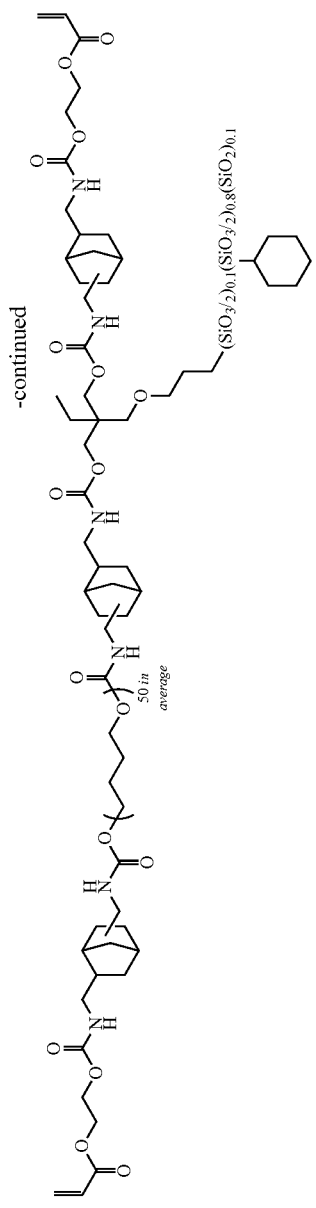
SSQ-pendant urethane-(meth)acrylate-3
Mw: 29000, Mw/Mn: 1.98
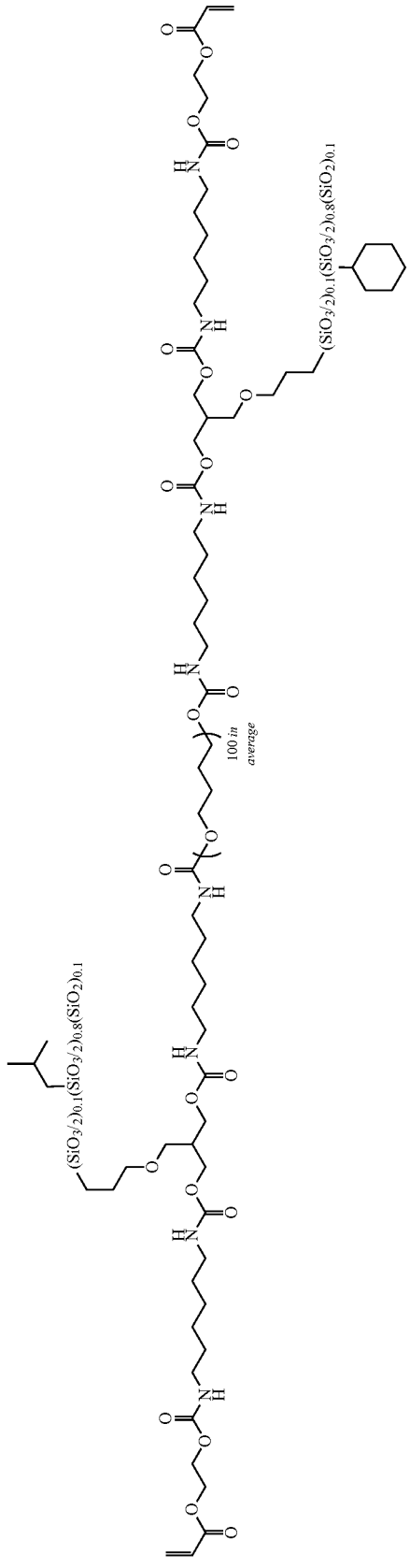
SSQ-pendant urethane-(meth)acrylate-4
Mw: 25000, Mw/Mn: 2.11

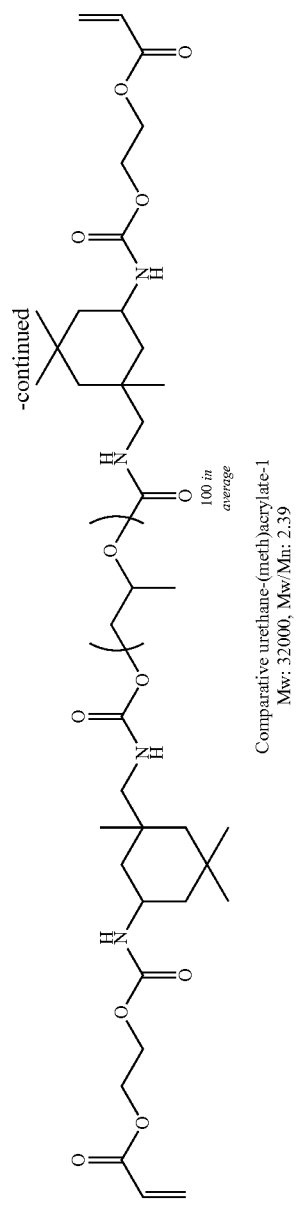

In the formulae, each repeating number represents the average value.

The following are Photo-radical generators-1 to 3 and Thermal-radical generators-1 and 2 blended to compositions as an additive.

Photo-radical generator-1: 2,4,6-trimethylbenzoyl-diphenyl-phosphine oxide

Photo-radical generator-2: 2,2-dimethoxy-2-phenylacetophenone

Photo-radical generator-3: (±)-camphorquinone

Thermal-radical generator-1: dimethyl 2,2'-azobis(2-methylpropionate)

Thermal-radical generator-2: azobisisobutyronitrile (AIBN)

The following is an organic solvent blended to compositions.

Organic solvent: propylene glycol monomethyl ether acetate (PGMEA)

EXAMPLES AND COMPARATIVE EXAMPLE

Each of Compositions-1 to 6 and Comparative composition-1 (solution for adhesive film) described in Table 1 was applied onto a polyethylene naphthalate (PEN) substrate with the thickness of 100 μm using an applicator, and baked at 100° C. for 10 minutes under a nitrogen atmosphere using an oven to evaporate the solvent. The coated film of each composition was cured by irradiation with 500 mJ/cm$^2$ of light using a 1,000 W xenon lamp in a nitrogen atmosphere in case of composition in which photo-radical generator was added; or by baking at 120° C. for 20 minutes under a nitrogen atmosphere in an oven in case of composition in which thermal-radical generator was added to prepare Adhesive films and Comparative adhesive film. From each of these Adhesive films and Comparative adhesive film, a tape with a width of 25 mm was cut, pressed to a stainless steel (SUS304) board, and left at room temperature for 20 hours. Then, the force (N/25 mm) for peeling the tape, which had been produced from the adhesive film, from the stainless board was measured at an angle of 180° and a speed of 300 mm/min by using a tensile tester (Examples 1 to 6, Comparative Example 1). The results of measurement of adhesion and film thickness are shown in Table 2.

TABLE 1

| Composition (adhesive film material) | Silicone-pendant urethane-(meth)acrylate (parts by mass) | Additive (parts by mass) | Organic solvent (parts by mass) |
|---|---|---|---|
| Composition-1 | SSQ-pendant urethane-(meth)acrylate-1 (100) | Photo-radical generator-1 (1) | PGMEA (150) |
| Composition-2 | SSQ-pendant urethane-(meth)acrylate-2 (100) | Photo-radical generator-2 (2) | PGMEA (150) |
| Composition-3 | SSQ-pendant urethane-(meth)acrylate-3 (50) SSQ-pendant urethane-(meth)acrylate-2 (50) | Photo-radical generator-3 (2) | PGMEA (150) |
| Composition-4 | SSQ-pendant urethane-(meth)acrylate-2 (90) SSQ-pendant urethane-(meth)acrylate-4 (10) | Photo-radical generator-3 (2) | PGMEA (150) |
| Composition-5 | SSQ-pendant urethane-(meth)acrylate-3 (50) SSQ-pendant urethane-(meth)acrylate-2 (50) | Thermal-radical generator-1 (3) | PGMEA (150) |
| Composition-6 | SSQ-pendant urethane-(meth)acrylate-3 (50) SSQ-pendant urethane-(meth)acrylate-2 (50) | Thermal-radical generator-2 (3) | PGMEA (150) |
| Comparative composition-1 | Comparative urethane-(meth)acrylate-1 (100) | Photo-radical generator-1 (1) | PGMEA (150) |

TABLE 2

| | Adhesive film | Composition (adhesive film material) | Adhesion (N/25 mm) | Thickness of resin (μm) |
|---|---|---|---|---|
| Example 1 | Adhesive film 1 | Composition-1 | 1.5 | 88 |
| Example 2 | Adhesive film 2 | Composition-2 | 2.1 | 91 |
| Example 3 | Adhesive film 3 | Composition-3 | 1.3 | 88 |
| Example 4 | Adhesive film 4 | Composition-4 | 1.6 | 89 |
| Example 5 | Adhesive film 5 | Composition-5 | 1.6 | 87 |
| Example 6 | Adhesive film 6 | Composition-6 | 1.4 | 88 |
| Comparative Example 1 | Comparative adhesive film 1 | Comparative composition-1 | 0.08 | 93 |

In Examples 1 to 6, each adhesive film formed from a composition (adhesive) based on polyurethane having a silsesquioxane-pendant exhibited excellent adhesion in spite of being based on polyurethane as shown in Table 2.

On the other hand, in Comparative Example 1, the adhesive film formed from a composition (adhesive) based on polyurethane without having a silsesquioxane-pendant failed to give sufficient adhesion as shown in Table 2.

From the above, it was revealed that the inventive adhesive film has excellent adhesion even in a thin film and excels in stretchability without having irritation to a living body, thereby having excellent properties as an adhesive film to stick a wearable device and so on to skin.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. An adhesive film comprising a resin having a silsesquioxane in a side chain and a urethane bond in a main chain, wherein the resin having a silsesquioxane in a side chain and a urethane bond in a main chain includes a structure shown by the following general formula (1):

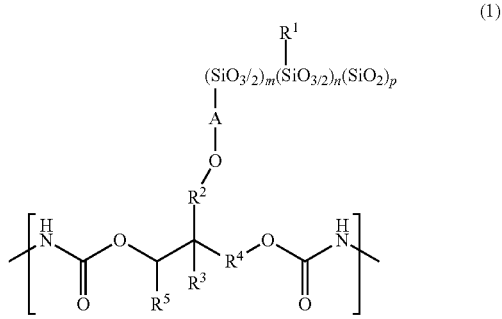

wherein R$^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom;

$R^2$ and $R^4$ each represent a single bond, a methylene group, or an ethylene group, and the total number of carbon atoms in $R^2$ and $R^4$ is 0 to 2;

$R^3$ represents a hydrogen atom or a linear alkyl group having 1 to 4 carbon atoms;

$R^5$ represents a hydrogen atom or a methyl group;

"A" represents a linear or branched alkylene group having 1 to 6 carbon atoms; and "m", "n", and "p" are numbers satisfying $0<m\leq0.2$, $0.4\leq n<1.0$, and $0.01\leq p<0.5$.

2. The adhesive film according to claim 1, wherein the resin having a silsesquioxane in a side chain and a urethane bond in a main chain is a reaction product of a diol compound shown by the following general formula (2) and a compound having an isocyanate group,

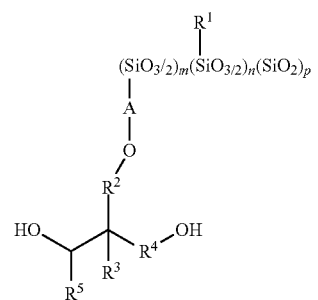

(2)

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom;

$R^2$ and $R^4$ each represent a single bond, a methylene group, or an ethylene group, and the total number of carbon atoms in $R^2$ and $R^4$ is 0 to 2;

$R^3$ represents a hydrogen atom or a linear alkyl group having 1 to 4 carbon atoms;

$R^5$ represents a hydrogen atom or a methyl group;

"A" represents a linear or branched alkylene group having 1 to 6 carbon atoms; and "m", "n", and "p" are numbers satisfying $0<m\leq0.2$, $0.4\leq n<1.0$, and $0.01\leq p<0.5$.

3. The adhesive film according to claim 1, wherein the resin having a silsesquioxane in a side chain and a urethane bond in a main chain is a reaction product of a diol compound shown by the following general formula (3) and a compound having an isocyanate group,

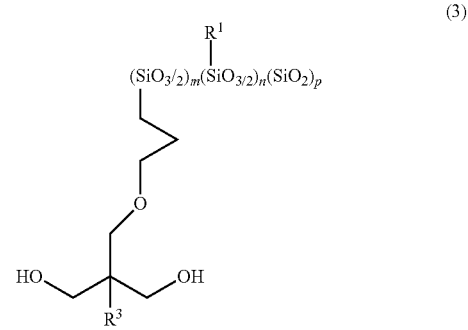

(3)

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom;

$R^3$ represents a hydrogen atom or a linear alkyl group having 1 to 4 carbon atoms; and "m", "n", and "p" are numbers satisfying $0<m\leq0.2$, $0.4\leq n<1.0$, and $0.01\leq p<0.5$.

4. The adhesive film according to claim 3, wherein the diol compound shown by the general formula (3) is a reaction product of compounds shown by the following general formulae (4)-1, (4)-2, and (4)-3:

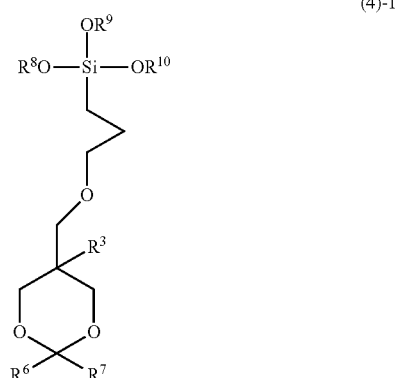

(4)-1

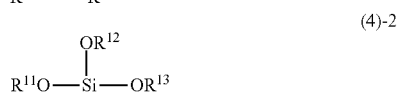

(4)-2

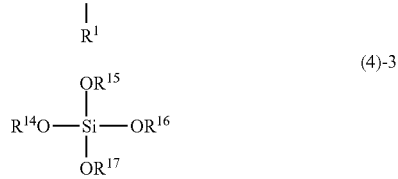

(4)-3 wherein $R^1$ and $R^3$ have the same meanings as defined above;

$R^6$ and $R^7$ each represent a hydrogen atom, a linear, branched, or cyclic alkyl group having 1 to 10 carbon atoms, an alkenyl group having 2 to 10 carbon atoms, an alkynyl group having 2 to 10 carbon atoms, or an aryl group having 6 to 10 carbon atoms;

$R^8$ to $R^{17}$ each represent a linear, branched, or cyclic alkyl group having 1 to 6 carbon atoms.

5. The adhesive film according to claim 1, wherein the resin having a silsesquioxane in a side chain and a urethane bond in a main chain is a cured material of a compound having a (meth)acrylate group at a terminal thereof shown by the following general formula (5):

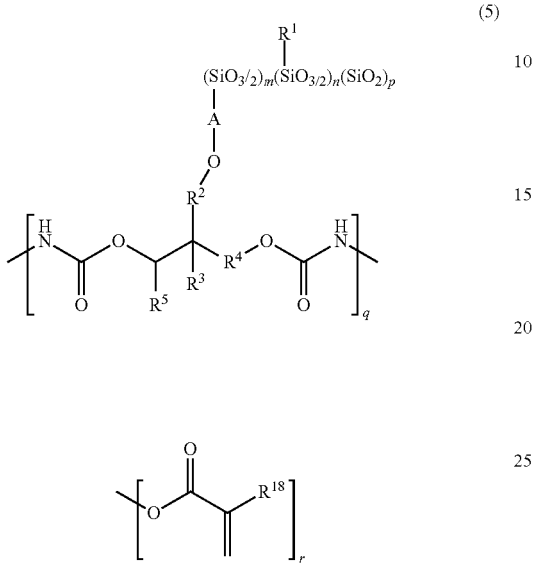

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom;

$R^2$ and $R^4$ each represent a single bond, a methylene group, or an ethylene group, and the total number of carbon atoms in $R^2$ and $R^4$ is 0 to 2;

$R^3$ represents a hydrogen atom or a linear alkyl group having 1 to 4 carbon atoms;

$R^5$ represents a hydrogen atom or a methyl group;

"A" represents a linear or branched alkylene group having 1 to 6 carbon atoms;

"m", "n", and "p" are numbers satisfying $0<m\leq0.2$, $0.4\leq n<1.0$, and $0.01\leq p<0.5$;

$R^{18}$ represents a hydrogen atom or a methyl group; and each of "q" and "r" is the number of unit in one molecule in the range of $1\leq q\leq 100$ and $1\leq r\leq 3$.

6. The adhesive film according to claim 1, wherein the resin having a silsesquioxane in a side chain and a urethane bond in a main chain has a weight average molecular weight of 500 or more.

7. A method for forming an adhesive film, comprising:

mixing at least a diol compound shown by the following general formula (2) and a compound having an isocyanate group to prepare a mixture, forming a film from the mixture, and curing the film by heating,

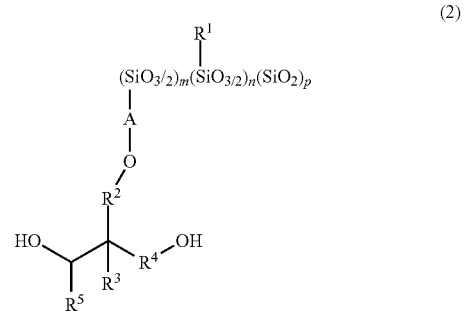

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom;

$R^2$ and $R^4$ each represent a single bond, a methylene group, or an ethylene group, and the total number of carbon atoms in $R^2$ and $R^4$ is 0 to 2;

$R^3$ represents a hydrogen atom or a linear alkyl group having 1 to 4 carbon atoms;

$R^5$ represents a hydrogen atom or a methyl group;

"A" represents a linear or branched alkylene group having 1 to 6 carbon atoms; and "m", "n", and "p" are numbers satisfying $0<m\leq0.2$, $0.4\leq n<1.0$, and $0\leq p<0.5$.

8. A method for forming an adhesive film, comprising:

forming a film from a composition containing a compound having a (meth)acrylate group at a terminal thereof shown by the following general formula (5), and curing the film by heating and/or light irradiation,

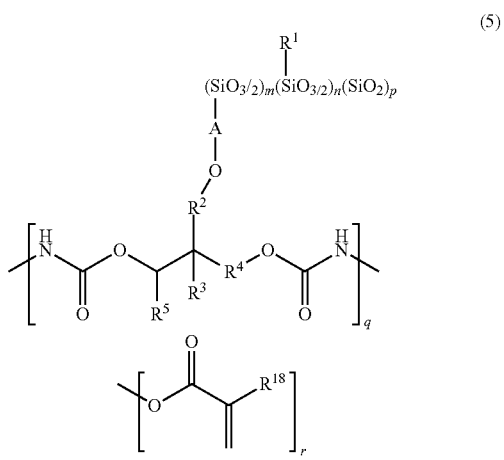

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom;

$R^2$ and $R^4$ each represent a single bond, a methylene group, or an ethylene group, and the total number of carbon atoms in $R^2$ and $R^4$ is 0 to 2;

$R^3$ represents a hydrogen atom or a linear alkyl group having 1 to 4 carbon atoms;

$R^5$ represents a hydrogen atom or a methyl group;

"A" represents a linear or branched alkylene group having 1 to 6 carbon atoms;

"m", "n", and "p" are numbers satisfying $0<m\leq0.2$, $0.4\leq n<1.0$, and $0.01\leq p<0.5$;

$R^{18}$ represents a hydrogen atom or a methyl group; and each of "q" and "r" is the number of unit in one molecule in the range of $1\leq q\leq100$ and $1\leq r\leq3$.

9. The method for forming an adhesive film according to claim 8, wherein the composition containing a compound having a (meth)acrylate group at a terminal thereof shown by the general formula (5) is formed into a film on a stretchable film, followed by curing by heating and/or light irradiation.

10. A urethane polymer comprising a (meth)acrylate group at a terminal thereof shown by the following general formula (5):

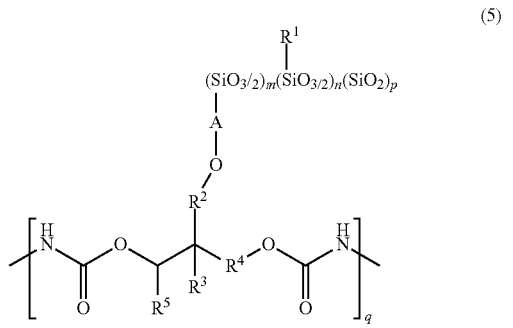

(5)

-continued

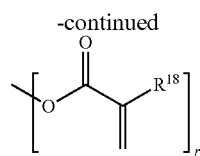

wherein $R^1$ represents a linear, branched, or cyclic alkyl group having 1 to 10 carbon atoms, an alkenyl group having 2 to 10 carbon atoms, or a substituted or unsubstituted aryl group having 6 to 10 carbon atoms, and $R^1$ is optionally substituted by a halogen atom;

$R^2$ and $R^4$ each represent a single bond, a methylene group, or an ethylene group, and the total number of carbon atoms in $R^2$ and $R^4$ is 0 to 2;

$R^3$ represents a hydrogen atom or a linear alkyl group having 1 to 4 carbon atoms;

$R^5$ represents a hydrogen atom or a methyl group;

"A" represents a linear or branched alkylene group having 1 to 6 carbon atoms;

"m" and "n" are numbers satisfying $0<m\leq0.2$ and $0.4\leq n<1.0$, "p" is a number in the range of $0.01\leq p<0.5$;

$R^{18}$ represents a hydrogen atom or a methyl group; and each of "q" and "r" is the number of unit in one molecule in the range of $1\leq q\leq100$ and $1\leq r\leq3$.

* * * * *